(12) United States Patent
Gargov

(10) Patent No.: US 10,969,512 B2
(45) Date of Patent: Apr. 6, 2021

(54) METAL DETECTOR

(71) Applicant: Tarsacci, LLC, Merced, CA (US)

(72) Inventor: Dimitar Gargov, Merced, CA (US)

(73) Assignee: Tarsacci LLC, Merced, CA (US)

( * ) Notice: Subject to any disclaimer, the term of this patent is extended or adjusted under 35 U.S.C. 154(b) by 82 days.

(21) Appl. No.: 16/408,459

(22) Filed: May 9, 2019

(65) Prior Publication Data

US 2019/0353818 A1 Nov. 21, 2019

Related U.S. Application Data

(60) Provisional application No. 62/673,021, filed on May 17, 2018.

(51) Int. Cl.
*G01V 3/165* (2006.01)

(52) U.S. Cl.
CPC .................. *G01V 3/165* (2013.01)

(58) Field of Classification Search
CPC ................. G01V 3/165; G01V 3/10
See application file for complete search history.

(56) References Cited

U.S. PATENT DOCUMENTS

| | | | |
|---|---|---|---|
| 3,904,062 A | 9/1975 | Grussen | |
| 6,474,491 B1 | 11/2002 | Benoit-Gonin | |
| 2002/0163346 A1* | 11/2002 | Arndt | G01V 3/104 324/639 |
| 2007/0046288 A1* | 3/2007 | Westersten | G01V 3/105 324/326 |
| 2009/0236304 A1 | 9/2009 | Watson | |
| 2009/0243754 A1 | 10/2009 | Conta et al. | |
| 2012/0025815 A1* | 2/2012 | Candy | G01V 3/104 324/239 |
| 2014/0347142 A1 | 11/2014 | Chang et al. | |
| 2015/0251827 A1 | 9/2015 | Campbell | |

OTHER PUBLICATIONS

International Search Report for PCT/US19/31893; dated Jul. 23, 2019.
Written Opinion of the International Searching Authority for PCT/US19/31893; dated Jul. 23, 2019.

* cited by examiner

*Primary Examiner* — Akm Zakaria

(57) ABSTRACT

A metal detector detects when a target that is a desirable metal object is located within a medium. A signal is transmitted into the medium. A response signal is received from the medium. The response signal includes a secondary medium response signal from the medium and includes a secondary target response signal from the target when the target is located within the medium. The response signal is amplified to produce an amplified signal. Compensation circuitry perform transmit coil transfer function compensation on the amplified signal to produce a compensated signal. A notch module removes a resistive component of the secondary medium response signal from the compensated signal. A signal vector resistive component demodulator produces a vector resistive component output signal from output of the notch module. A vector reactive component demodulator produces a vector reactive component output signal from the output of the notch module. Output from the signal vector resistive component demodulator and the signal vector reactive component demodulator is digitized to produce digital signals. A digital signal processor processes the digital signals.

18 Claims, 3 Drawing Sheets

METAL DETECTOR

BACKGROUND

Metal detectors exist in a variety of forms and are designed to detect desirable metal objects, herein referred to as targets. These include hand-held battery operated metal detectors, vehicle mounted metal detectors, walk through metal detectors and so on. A typical metal detector has a search sensor composed of a transmit coil and a receive coil. In some metal detectors a single coil acts as both the transmit coil and the receive coil. The transmit coil generates a time-varying magnetic field signal which excites various targets such as coins, mines, artifacts and so on that are buried in mediums such as soil, salt water beaches, clay, black sand and so on. In response to a transmitted magnetic field signal, targets generate secondary magnetic fields. Further, a medium that is conductive, magnetic, or conductive and magnetic will also generate its own secondary magnetic field in response to the transmitted magnetic field signal. The physics is well noun.

The receive coil picks up a response signal that is a function of the sum of the secondary magnetic fields from the target and the medium. Signal processing on the response signal is performed to produce an alert output to an operator to indicate when a desirable target is detected.

The parameters of the response signal are affected by a variety of factors including target and medium transfer functions, distance from the search sensor, parameters of search sensor coils, generated transmit magnetic field, and frequency of transmit signal and so on. The parameters of search sensor coils include, for example dimensions of the coils, number of turns, coil DC resistance and so on.

DETAILED DESCRIPTION

A target's electromagnetic behavior can be modeled with a target transfer function which is represented as a sum of a target magnetic component transfer function and a target resistive component transfer function. Likewise, a medium electromagnetic behavior can be modeled with a medium transfer function which is represented as a sum of a medium magnetic component transfer function and a medium resistive component transfer function. The response signal from a target will be a sum of target magnetic and target resistive components. The medium response signal will be a sum of medium magnetic and medium resistive components. When the medium is uniform, there is a correlation between the resistive and the magnetic components of the medium response signal. This makes it relatively easy to compensate or remove the undesired medium signal. When the medium is not uniform, there may be little or no correlation between the resistive and magnetic components of the medium response signal. If the undesirable medium signal is not removed or compensated for, the performance of the metal detector may suffer by producing false positive outputs to the operator, reducing the detectable range of a desired target, completely masking a secondary target signal or resulting in incorrect target identification.

Figure 1:
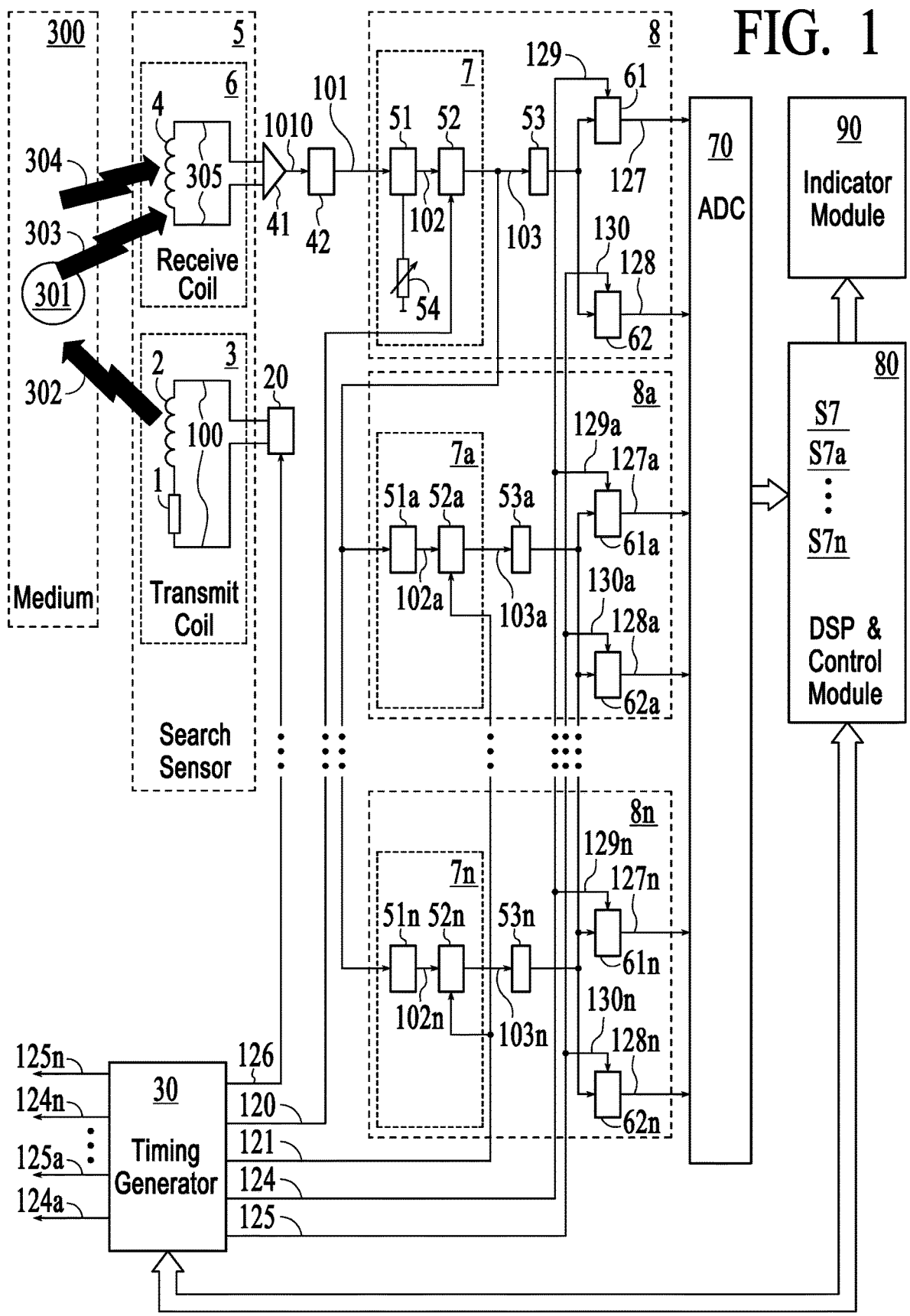
FIG. 1 is a block diagram of a metal detector.

FIG. 1 shows a simplified block diagram for a metal detector. The metal detector uses a medium resistive component inverse transfer function to compensate for the medium resistive component and uses preset target resistive component inverse transfer functions to properly identify the target.

The metal detector signal processing applies the preset medium resistive component inverse transfer function ($1/W_{mr}$) to the signal received by the metal detector's receiver and processes it in a time domain manner to compensate and remove the medium's resistive component from the signal received by the metal detector's receiver. The response signal is demodulated with vector resistive, denoted R, and vector reactive, denoted X, quadrature synchronous demodulators to be analyzed in the frequency domain and to remove the medium's magnetic component. The R demodulator is most sensitive to the purely resistive secondary field and the X demodulator is most sensitive to the purely reactive secondary field components for the demodulator's reference signal frequency. The phase reference signals frequency of the R and X demodulators can be the fundamental or harmonic frequency of the metal detector excitation signal as required to analyze the response signal vector at that frequency in the frequency domain. Multiple parallel channels with transfer functions the same as the inversed target resistive component transfer function and different discrete preset timing constants can be used to improve the target identification. Processing the received signal in both the time domain and the frequency domain provides the advantages of time domain metal detectors such as good immunity to high mineralize ground, salt water, red clay and so on, and provides the advantages of frequency domain metal detector such as fast response time, good target separation, noise immunity, precise target identification and so on.

Specifically, FIG. 1 shows that the metal detector includes a search sensor 5 that has a transmitter component composed of a transmit coil 3 and a receiver component composed of a receive coil 6. For example, in FIG. 1, transmit coil 3 is modeled as an effective transmit coil inductive component 2 in series with a resistive component 1. Resistive component 1 is the sum of the transmit coil DC resistance, search sensor cable DC resistance and a voltage power amplifier 20 output resistance. For example, a typical range for inductance ($L_{tc}$) of effective transmit coil inductive ($L_{tc}$) component 2 is 200 Microhenry (μH) to 1000 μH. A typical range for resistance ($R_{tc}$) of resistive component 1 is 0.5 Ohms to 2.0 Ohms.

Voltage power amplifier 20, connected to transmit coil 3, generates a voltage signal that results in an excitation signal 100 that emanates from transmit coil 3 to produce an alternating magnet field 302. Alternating magnetic field 302 induces voltage in a target 301 and induces voltage in a medium 300. The induced voltage in target 301 and medium 300 generate a secondary target magnetic field 303 and a secondary medium magnetic field 304. A timing generator 30 presents a bipolar square waveform system excitation signal 126 to voltage power amplifier 20 that voltage power amplifier 20 amplifies to produce excitation signal 100. For illustration, FIG. 1 shows a target 301 within medium 300.

Figure 2:
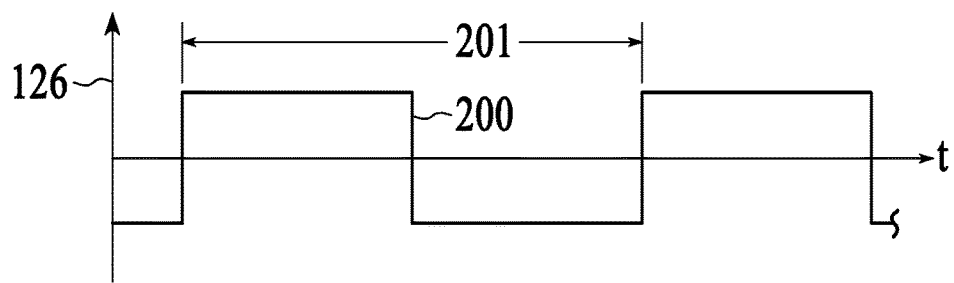
FIG. 2, FIG. 3, FIG. 4, FIG. 5, FIG. 6, FIG. 7, FIG. 8, FIG. 9, FIG. 10, and FIG. 11, illustrate waveforms of different metal detector signals resulting from a bipolar square waveform excitation signal and the presence of medium and target.

FIG. 2 shows an example waveform 200 of bipolar square waveform system excitation signal 126. Waveform 200 has a period with duration 201.

Figure 3:
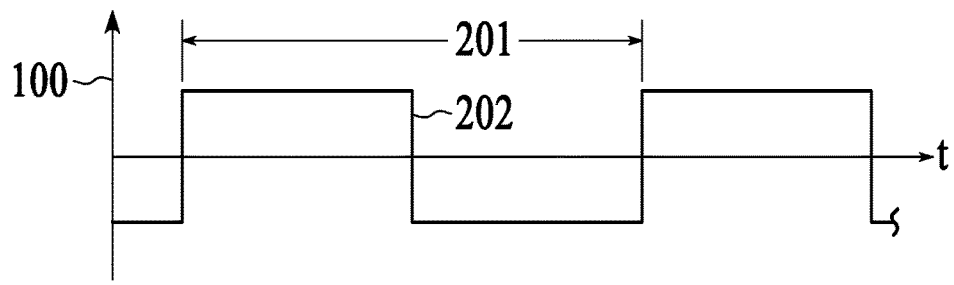

FIG. 3 shows an example waveform 202 of excitation signal 100. Waveform 202 also has a period with duration 201. The waveform of excitation signal can vary from what is shown in FIG. 3. For example, excitation signal 100 can have, a square waveform, a bipolar square waveform, a rectangular waveform, a multilevel rectangular waveform or another type of waveform.

As shown in FIG. 1, a receive coil 6 has an inductive component 4. The induced voltage, response signal 305, in receive coil 6 inductive component 4 is a product of the alternating magnetic field generated by transmit coil 3. This is a sum of the secondary target magnetic field 303 and the secondary medium magnetic field 304. A pre-amplifier 41 amplifies response signal 305 and forwards an amplified signal 1010 to compensation circuitry 42. Compensation circuitry 42 includes transmit coil transfer function compensation electronics that produce a detected signal 101.

Figure 11:
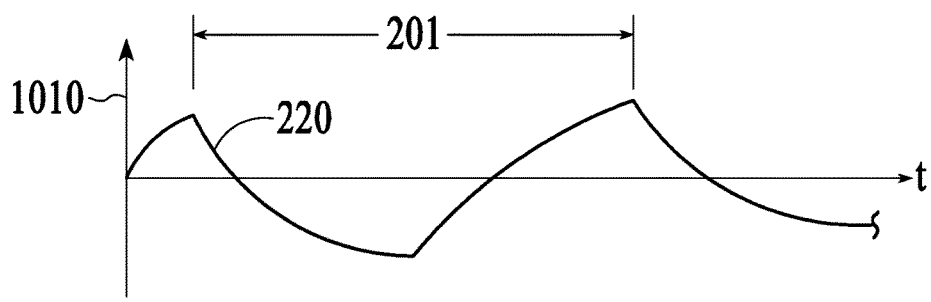

For example, FIG. 11 shows an example waveform 220 for amplified signal 1010.

Figure 7:
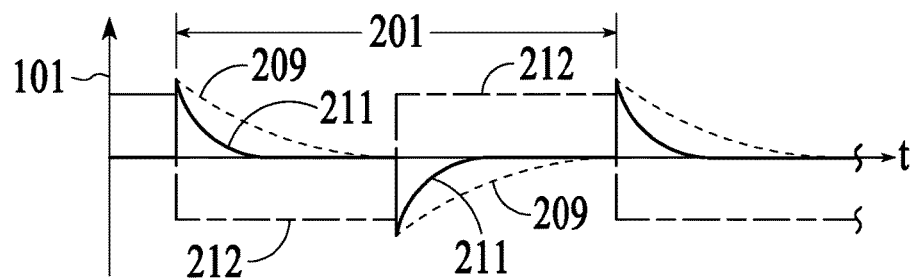

For example, FIG. 7 shows waveform examples for detected signal 101 illustrating metal detector response to secondary target magnetic field 303 and secondary medium magnetic field 304 at compensation circuitry 42 output. For better illustration, the resistive and magnetic components of medium and target waveforms are separated. A waveform 211 represents the response from the medium resistive component ($M_{mr}$). A waveform 212 represents the response from the medium magnetic component ($M_{mm}$). Waveform 209 represents the non-ferrous target response. For simplicity of representation, in this example, the target is non-ferrous (target magnetic component is zero).

As shown in FIG. 1, a metal detector module 8 includes a notch module 7. Notch module 7 is used to filter out the medium resistive component from detected signal 101. Notch module 7 includes medium resistive component compensation electronics 51, with a transfer function the same as the medium's resistive component inverse transfer function and adjustable timing constant, and a gate 52. A regulator 54 is used to adjust the medium resistive component compensation circuit 51 preset timing constant ($T_{mrc}$) to the medium resistive component transfer function timing constant. Medium resistive component compensation circuit 51 generates an output signal 102.

Figure 8:
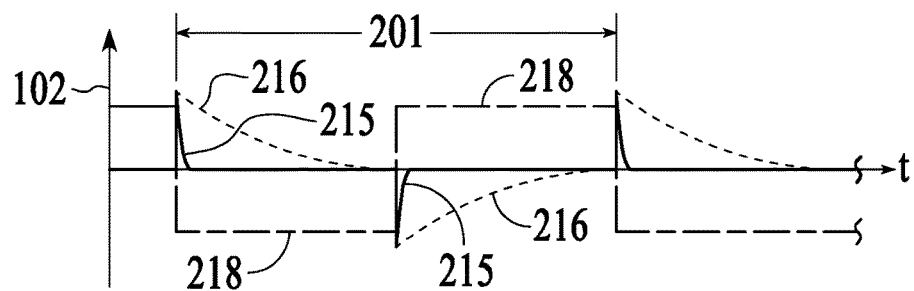

FIG. 8 shows example waveforms for output signal 102. The waveforms includes target waveform 216 that represents the secondary magnetic field from the target, includes medium resistive component waveform 215 that represents the resistive component ($M_{mr}$) for the medium and includes medium magnetic component waveform 218 that represents the magnetic component ($M_{mm}$) for the medium.

Timing generator 30 generates a gate control signal 120 to control gate 52 in order to produce gate output signal 103. When gate control signal 120 is high, control gate 52 is open and output signal 102 passes through control gate 52. When gate control signal 120 is Low, output signal 102 is blocked. A noise rejection low pass filter 53 filters gate output signal 103. For example, noise rejection low pass filter 53 has a cutoff frequency between 60 kHz and 70 kHz.

Figure 6:
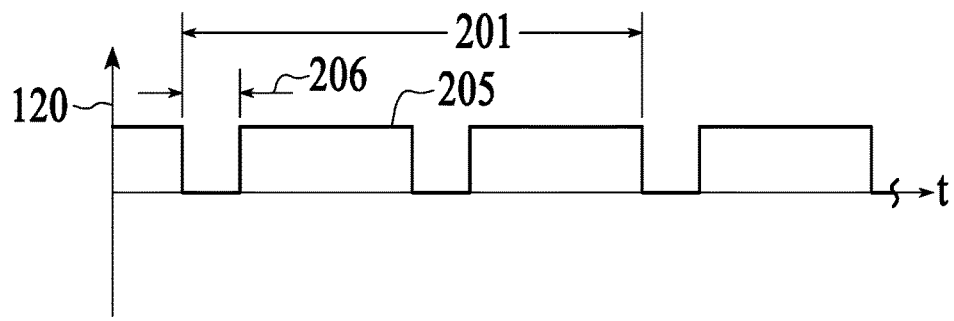

FIG. 6 shows an example waveform 205 for digital control signal 120. In waveform 205, each falling edge is aligned with a transition (either a falling edge or a rising edge) of waveform 200 for bipolar square waveform system excitation signal 126, shown in FIG. 2. In waveform 205, a falling edge is followed by a rising edge after digital control signal time width 206.

Figure 9:
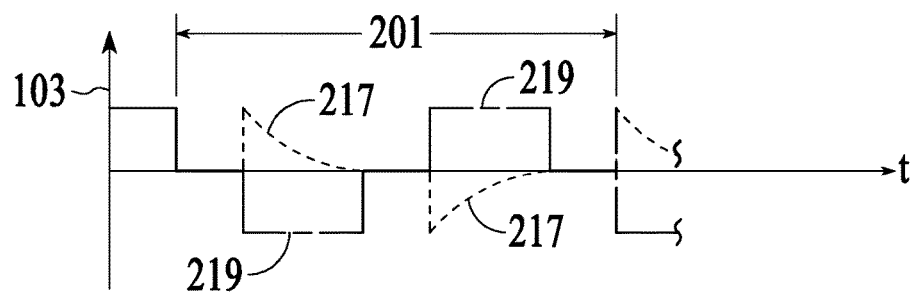

FIG. 9 shows sample waveforms for gate output signal 103. The waveforms includes target waveform 217 that represents the secondary magnetic field from the target and includes medium magnetic component waveform 219 that represents the magnetic component ($M_{mm}$) for the medium.

Metal detector module 8 also includes quadrature signal 103 vector resistive (R) and reactive (X) components synchronous demodulators consisting of a vector resistive (R) component demodulator 61 and a vector reactive (X) component demodulator 62. Noise rejection low pass filter 53 forwards the filtered signal to signal's vector resistive component demodulator 61 and a signal's vector reactive component demodulator 62. Demodulator 61 and demodulator 62 each include a low pass filter (LPF) with, for example, a 15 Hz to 20 Hz cutoff frequency. The low pass filters within demodulator 61 and demodulator 62 filter all undesirable products from the demodulation process. Timing generator 30 provides an in-phase (with signal 126 with waveform 200) reference signal 124 with waveform 203 received on an input 129 of demodulator 61 and a quadrature to signal 126 with waveform 200 reference signal 125 with waveform 204 received on an input 130 of demodulator 62. Demodulator 61 produces an output signal 127 that is proportional to the vector resistive component of gate output signal 103, for gate output signal 103 having a fundamental frequency with a period duration 201. Demodulator 62 produces an output signal 128 that is proportional to the vector reactive component for gate output signal 103 fundamental frequency with a period duration 201.

Figure 4:
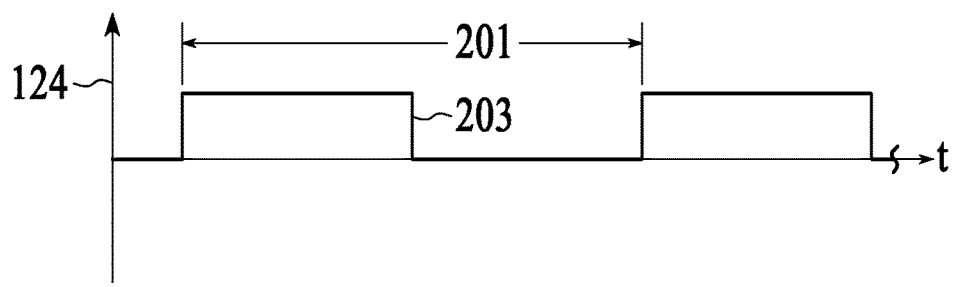
Figure 5:
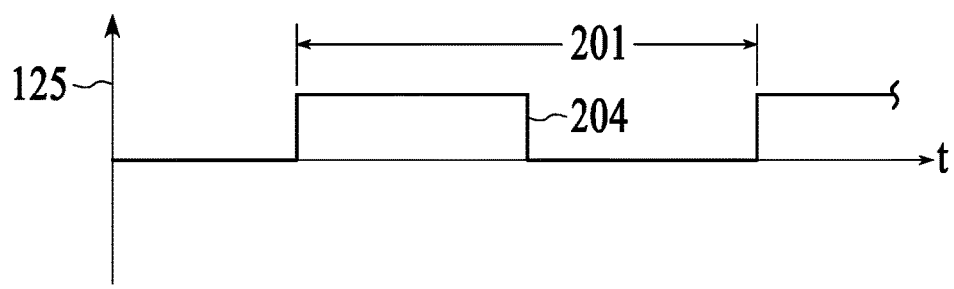

FIG. 4 shows an example waveform 203 of in-phase reference signal 124. FIG. 5 shows an example waveform 204 quadrature reference signal 125. Both, waveform 202 and waveform 203 have a period with duration 201.

A multi-channel analog-to-digital converter (ADC) 70 digitizes output signals from demodulator 61 and demodulator 62 to provide digitized signals for further signal processing by a digital signal processor (DSP) and control module 80.

An indicator module 90, connected to DSP and control module 80, produces a desirable metal detected signal to the operator when a desired target is detected. In some embodiments timing generator 30 can be incorporated into DSP and control module 80.

For example, introducing multiple modules with transfer functions with preset timing constants and analyzing the modules composite signals increases resolution used in determination of a timing constant ($T_t$) for the target resistive component transfer function and allows identification of the target.

This is illustrated in FIG. 1 by a metal detector module 8$a$ and a metal detector module 8$n$ which represent any number of multiple modules 8$a$ . . . 8$n$ with the internal target resistive component notch modules 7$a$ . . . 7$n$. The modules 7$a$ . . . 7$n$ target resistive component compensation circuits 51$a$ . . . 51$n$ transfer function is the target resistive component inversed transfer function and different preset timing constants T51$a$ . . . T51$n$. Analyzing the composite signals S7$a$ . . . S7$n$ product of the module's 8$a$ . . . 8$n$ outputs, allows determination of the timing constant ($T_t$) for the target and the target identification.

FIG. 1 shows gate output signal 103 providing input to target resistive component compensation circuit 51$a$ of a notch module 7$a$ within metal detector module 8$a$ and providing input to target resistive component transfer function compensation circuit 51$n$ of a notch module 7$n$ within metal detector module 8$n$. Notch module 7$a$ is used to filter out target's resistive component with a transfer function timing constant equal to target resistive component compensation circuit 51$a$ transfer function preset timing constant, still present in gate output signal 103. Likewise, notch module 7$n$ is used to filter out another target's resistive component with a transfer function timing constant equal to the target resistive component compensation circuit 51n transfer function preset timing constant, still present in gate output signal 103.

Timing generator 30 generates a digital gate control signal 121 to control a gate 52a in order to produce gate output signal 103a and to control a gate 52n in order to produce gate output signal 103n. When gate control signal 121 is high, the gates are open and signals pass through the gates. When gate control signal 121 is Low the signals are blocked.

Figure 10:
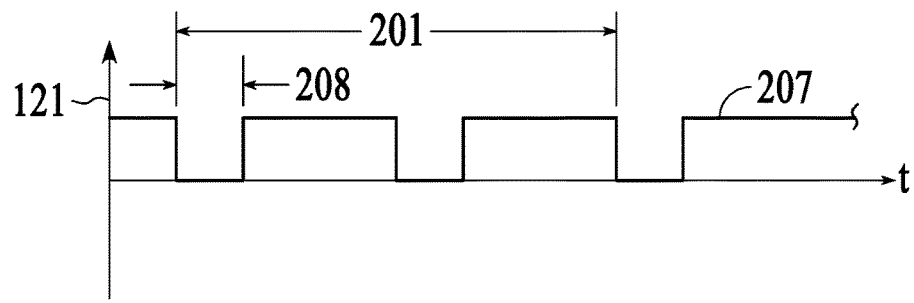

FIG. 10 shows an example waveform 207 for digital control signal 121 used to control gates 52a . . . 52n. Every falling edge for waveform 207 for digital control signal 121 is aligned with a corresponding falling edge of waveform 205 for digital control signal 120, shown in FIG. 6. In waveform 207, a falling edge is followed by a rising edge after a time duration 208 where time duration 208 greater than digital control signal time width 206 of waveform 205.

A noise reduction low pass filter (LPF) 53a input receives gate output signal 103a from gate 52a output. For example, LPF 53a has a cutoff frequency between 60 kHz and 70 kHz. An output of LPF 53a is used to drive quadrature, Ra and Xa, synchronous demodulators 61a and 62a. Timing generator 30 provides in-phase reference signal 124 received on an input 129a of demodulator 61a and quadrature reference signal 125 received on an input 130a of demodulator 62a. Demodulator 61a produces an output signal 127a that is proportional to signal 103a vector resistive component of gate output signal 103a. Demodulator 62a produces an output signal 128a that is proportional to signal 103a vector reactive component.

While FIG. 1 shows the timing generator 30 providing fundamental transmit signal frequency quadrature reference signal pair 124 and 125 to demodulator 61a and demodulator 62a, instead one of the transmit signal harmonics frequency quadrature reference signal pairs may be provided. Demodulators 61a and 62a include a low pass filter (LPF) with, for example, a 15 Hz to 20 Hz cutoff frequency. Demodulators 61a and 62a LPF filter all undesirable products from the demodulation process. For example, transmit signal harmonics frequency quadrature reference signal pairs being generated by timing generator 30 are represented in FIG. 1 by transmit signal harmonics frequency quadrature reference signal pair 124a and 125a, and by transmit signal harmonics frequency quadrature reference signal pair 124n and 125n.

A noise reduction LPF 53n input receives gate output signal 103n from gate 52n output. An output of LPF 53n is used to drive quadrature, Rn and Xn, synchronous demodulators 61n and 62n. Demodulators 61n and 62n include a low pass filter (LPF) with, for example, a 15 Hz to 20 Hz cutoff frequency. Demodulators 61n and 62n LPF filter all undesirable products from the demodulation process. Timing generator 30 provides an in-phase reference signal 124n received on an input 129n of demodulator 61n and a quadrature reference signal 125n received on an input 130n of demodulator 62n. Demodulator 61n produces an output signal 127n that is proportional to the vector resistive component of gate output signal 103n. Demodulator 62n produces an output signal 128n that is proportional to the vector reactive component.

While FIG. 1 shows the timing generator 30 providing fundamental transmit signal frequency quadrature reference signal pair 124 and 125 to demodulator 61n and demodulator 62n, instead one of the transmit signal harmonics frequency quadrature reference signal pairs may be supplied. These are represented in FIG. 1 by transmit signal harmonics frequency quadrature reference signal pair 124a and 125a, and by transmit signal harmonics frequency quadrature reference signal pair 124n and 125n.

For example, each of metal detector modules 8a . . . 8n are identical modules with different target resistive component compensation circuits 51a . . . 51n preset timing constants T51a . . . T51n as determined by target resistive component compensation circuits 51a . . . 51n. The parallel connection arrangement of metal detector modules 8a . . . 8n improves target resistive component identification resolution. The metal detector modules 8a . . . 8n, inputs are connected to gate output signal 103, free of the medium resistive component, and outputs 127a . . . 127n and outputs 128a . . . 128n are all connected to the multi-channel ADC 70 for digitizing.

The number of modules can be varied to give sufficient resolution for an intended target. For example, when the target is a coin three to four metal detector modules 8a . . . 8n with different timing constants T51a . . . T51n provides resolution sufficient for a good target identification where, T51a<T51b< . . . <T51n, and where timing constants T51a . . . T51n are in range of 10 Microseconds (μS) to 200 μS.

DSP and control module 80 evaluates digitized signals resulting from multi-channel ADC 70. The signals are analyzed as a system of transfer functions. For example, for detecting coin targets, transmit signal fundamental frequency of excitation signal 100 can be in range of 5 KHz to 30 KHz.

The metal detector, target and the medium will be analyzed as a system. An example analysis follows for a bipolar square waveform system excitation signal 126 with a presence of medium 300 and target 301. To simplify the analysis, the receive electronics finite frequency and the finite impulse response time are neglected. Equation 1 below represents voltage $U_{101}$ in complex form for detected signal 101. Excitation signal 100 with voltage $U_{100}$ and a bipolar square waveform is the system excitation signal. The medium's transfer function is represented as a sum of the $W_{mr}$ medium resistive component transfer function multiplied by the medium resistive component coupling coefficient $K_{mr}$ and the medium magnetic component transfer function $W_{mm}$ multiplied by the medium magnetic component coupling coefficient $K_{mm}$. The target transfer function is represented as a sum of the target resistive component transfer function $W_{tr}$ and the target magnetic component transfer function $W_{tm}$ multiplied by the target coupling coefficient $K_t$.

Equation 1
$$U_{101} = sU_{100}K_sW_{tcc}W_{tc}[(W_{tr} + W_{tm})K_t + W_{mr}K_{mr} + W_{mm}K_{mm}]$$

For $W_{tcc} = \dfrac{1}{W_{tc}}$

Equation 2
$$U_{101} = sU_{100}K_s[(W_{tr} + W_{tm})K_t + W_{mr}K_{mr} + W_{mm}K_{mm}]$$

Equation 3
$$U_{102} = sU_{100}K_s[W_{mrc}(W_{tr} + W_{tm})K_t + W_{mr}W_{mrc}K_{mr} + W_{mm}W_{mrc}K_{mm}]$$

For $W_{mrc} = \dfrac{1}{W_{mr}}$

Equation 4
$$U_{102} = sU_{100}K_sW_{mrc}K_t(W_{tr} + W_{tm}) + sU_{100}K_sK_{mr} + sU_{100}K_sW_{mm}W_{mrc}K_{mm}$$

Equation 5
$$U_{mrpr} = sU_{100}K_sK_{mm}$$

-continued $$U_{mmpr} = sU_{100}K_sW_{mm}W_{mrc}K_{mm}$$ Equation 6

$$U_{103} = sU_{100}K_sW_{mrc}K_t(W_{tr} + W_{tm}) + sU_{100}K_sK_{mm}W_{mm}W_{mrc}$$ Equation 7

$$W_{trc} = \frac{1}{W_{tr}}$$ Equation 8

In Equations 1 through 8 above, the following notation is used:

$W_{tc}=1/(sTtc+1)$—transmit coil transfer function with timing constant $T_{tc}=L_{tc}/R_{tc}$;

$W_{tcc}$—transmit coil compensation electronic 42 transfer function;

$W_{mr}$—Medium resistive component transfer function;

$W_{mm}$—Medium magnetic component transfer function;

$K_{mr}$—Medium resistive component coupling coefficient $K_{mm}$—Medium magnetic component coupling coefficient $W_m$—Medium resistive component compensation electronics 51 transfer function;

$W_{tr}$—Target resistive component transfer function;

$W_{tm}$—Target magnetic component transfer function $W_{trc}$—Target resistive component compensation electronics 51a . . . 51n transfer function $K_t$—Target coupling coefficient $K_s$—System gain;

s—Complex frequency variable.

To eliminate the transmit coil transfer function influence, the $W_{tc}$ is preset to $$W_{tcc} = \frac{1}{W_{tc}}$$

and the results for $U_{101}$ is Equation 2 (practical values for Ttc are between 400 and 1000 uS). Voltage $U_{102}$ for output signal 102 is given in Equation 3 with a waveform such as that shown in FIG. 7. The resistive component compensation transfer function for medium 300 timing constant is preset in medium resistive component compensation circuit 51 with regulator 54 to be equal to the medium resistive component timing constant $$W_{mrc} = \frac{1}{W_{mr}}$$

and the result for $U_{102}$ is shown calculated by Equation 4.

The product of the medium restive component $U_{mrpr}$ is calculated in Equation 5 as a derivative with only $U_{100}$ as a variable. For $U_{100}$ with a fast transients bipolar square waveform and due to finite $U_{100}$ transient time, finite system frequency response, system finite response time, and the $W_{mrc}$ is not exactly equal to $$\frac{1}{W_{mr}},$$

the $U_{mmpr}$ will have a last decaying waveform. The result is medium waveform 215 for output signal 102, as shown in FIG. 8. For the cases where $U_{100}$ has a square waveform, a rectangular waveform, or a multilevel rectangular waveform, the result will be the same.

In order to completely remove the resistive component for medium 300, gate 52 has to be closed for a short period of time, for example, 2 micro seconds (uS) to 4 uS. This is illustrated in FIG. 6 for gate 52, digital control signal 120 waveform 205 has a falling edge aligned with every signal 126 transient and digital control signal time width 206.

Gate output signal 103, generated by gate 52, is free of the resistive component of medium 300. Equation 7 is an approximate equation for voltage $U_{103}$ for gate output signal 103. The remaining medium magnetic component $U_{mmpr}$, represented in Equation 6, is nulled by summing the weighted reactive vector component (output signal 128) and the resistive component (output signal 127), in the frequency domain. The resulted composite signal S7 will indicate the target presence. Signal S7 is an internal signal for module 80. The signal's 103 vector phase provides the target identification (ID) information.

The input to notch module 7a is gate output signal 103, which will be free of the resistive component from medium 300. The target resistive component compensation circuit 51a transfer function Equation 8 is inversed target's resistive component transfer function with preset timing constant T51a.

If the resistive component transfer function for target 301 timing constant is equal to the target resistive component compensation circuit 51a transfer function timing constant T51a for target resistive component compensation circuit 51a, the output response to the target's resistive component (due to: finite $U_{100}$ transient time, finite system frequency response, system finite response time) will have a fast decaying waveform. To completely remove it, the gate 52a has to be closed for a short time duration 208 as illustrated in FIG. 10 and as controlled by digital control signal 121. The time duration 208 is larger than digital control signal time width 206 by one to three Microseconds. Nulling the remaining medium magnetic component is done by summing the weighted reactive vector component (signal 128a) and the resistive component (signal 127a) for metal detector module 8a. The resulted composite signal S7a will be free of the magnetic component for medium 300. The composite signal S7a for targets with a resistive component transfer function timing constant $T_t$ will be:

A: $T51a > T_t$ = negative

B: $T51a = T_t$ = zero

C: $T51a < T_t$ = positive.

In this way multiple modules 8a . . . 8n with preset timing constants T51a . . . T51n and analyzing the modules composite signals S7a . . . S7n allows determination of the timing constant $T_t$ range and the identification of target 301.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A metal detector for detecting when a target that is a desirable metal object is located within a medium, comprising:

a transmitter that transmits a signal into the medium;

a receiver that receives a response signal from the medium, the response signal including a secondary medium response signal from the medium and includes a secondary target response signal from the target when the target is located within the medium;
a preamplifier that amplifies the response signal to produce an amplified signal;
compensation circuitry that performs transmit coil transfer function compensation on the amplified signal to produce a compensated signal;
a notch module that removes a resistive component of the secondary medium response signal from the compensated signal;
a signal vector resistive component demodulator that produces a vector resistive component output signal from output of the notch module;
a vector reactive component demodulator that produces a vector reactive component output signal from the output of the notch module;
an analog-to-digital converter that digitizes output from the signal vector resistive component demodulator and the vector reactive component demodulator to produce digital signals; and
a digital signal processor that processes the digital signals;
wherein the notch module includes:
    a medium resistive component transfer function compensation circuit,
    a gate, the gate and the medium resistive component transfer function compensation circuit being configured to remove the resistive component of the secondary medium response signal from the compensated signal, and
    a regulator that adjusts a medium resistive component transfer function timing constant.

2. The metal detector as in claim 1, additionally comprising a low pass filter that performs low pass filtering on the output from the notch module prior to the output from the notch module being received by the signal vector resistive component demodulator and the vector reactive component demodulator.

3. A metal detector for detecting when a target that is a desirable metal object is located within a medium, comprising:
a transmitter that transmits a signal into the medium;
a receiver that receives a response signal from the medium, the response signal including a secondary medium response signal from the medium and includes a secondary target response signal from the target when the target is located within the medium;
a preamplifier that amplifies the response signal to produce an amplified signal;
compensation circuitry that performs transmit coil transfer function compensation on the amplified signal to produce a compensated signal;
a notch module that removes a resistive component of the secondary medium response signal from the compensated signal;
a signal vector resistive component demodulator that produces a vector resistive component output signal from output of the notch module;
a vector reactive component demodulator that produces a vector reactive component output signal from the output of the notch module;
an analog-to-digital converter that digitizes output from the signal vector resistive component demodulator and the vector reactive component demodulator to produce digital signals;
a digital signal processor that processes the digital signals;
a second notch module that removes a resistive component of the secondary target response signal from the output of the notch module when the target is located within the medium;
a second signal vector resistive component demodulator that produces a vector resistive component output signal from output of the second notch module; and
a second vector reactive component demodulator that produces a second vector reactive component output signal from the output of the second notch module;
wherein the analog-to-digital converter digitizes output from the second signal vector resistive component demodulator and the second signal vector reactive component demodulator to produce second digital signals.

4. The metal detector as in claim 3, additionally comprising:
a third notch module that removes a resistive component of the secondary target response signal from the output of the notch module when the target is located within the medium;
a third signal vector resistive component demodulator that produces a vector resistive component output signal from an output of the third notch module;
a third vector reactive component demodulator that produces a second vector reactive component output signal from the output of the third notch module;
wherein the analog-to-digital converter digitizes output from the third signal vector resistive component demodulator and the third signal vector reactive component demodulator to produce third digital signals.

5. The metal detector as in claim 3, wherein the second notch module includes:
a target resistive component transfer function compensation circuit; and
a gate, the gate and the target resistive component transfer function compensation circuit being configured to remove the resistive component of the secondary target response signal from the output of the notch module.

6. The metal detector as in claim 3 additionally comprising:
a timing generator that provides timing signals to a power amplifier for the transmitter, the notch module, the signal vector resistive component demodulator, the vector reactive component demodulator, the second notch module, the second signal vector resistive component demodulator, the second vector reactive component demodulator.

7. The metal detector as in claim 3, additionally comprising:
a low pass filter that performs low pass filtering on the output from the second notch module prior to the output from the second notch module being received by the second signal vector resistive component demodulator and the second vector reactive component demodulator.

8. The metal detector as in claim 1 wherein the transmitter includes a transmit coil and the receiver includes a receive coil.

9. The metal detector as in claim 1 additionally including a timing generator that provides timing signals to a power amplifier for the transmitter, the notch module, the signal vector resistive component demodulator and the vector reactive component demodulator.

10. A method for detecting when a target that is a desirable metal object is located within a medium, comprising:

transmitting a signal into the medium;
receiving a response signal from the medium, the response signal including a secondary medium response signal from the medium and includes a secondary target response signal from the target when the target is located within the medium;
amplifying the response signal to produce an amplified signal;
using compensation circuitry to perform transmit coil transfer function compensation on the amplified signal to produce a compensated signal;
removing a resistive component of the secondary medium response signal from the compensated signal by a notch module;
using a signal vector resistive component demodulator to produce a vector resistive component output signal from output of the notch module;
using a vector reactive component demodulator to produce a vector reactive component output signal from the output of the notch module;
digitizing output from the signal vector resistive component demodulator and the signal vector reactive component demodulator to produce digital signals;
using a digital signal processor to process the digital signals;
wherein removing the resistive component of the secondary medium response signal from the compensated signal by the notch module is performed using a medium resistive component transfer function compensation circuit and a gate, wherein the gate and the medium resistive component transfer function compensation circuit are configured to remove the resistive component of the secondary medium response signal from the compensated signal, and wherein a regulator adjusts a medium resistive component transfer function timing constant.

11. The method as in claim 10, additionally comprising:
performing low pass filtering on the output from the notch module prior to the output from the notch module being received by the signal vector resistive component demodulator and the vector reactive component demodulator.

12. A method for detecting when a target that is a desirable metal object is located within a medium, comprising:
transmitting a signal into the medium;
receiving a response signal from the medium, the response signal including a secondary medium response signal from the medium and includes a secondary target response signal from the target when the target is located within the medium;
amplifying the response signal to produce an amplified signal;
using compensation circuitry to perform transmit coil transfer function compensation on the amplified signal to produce a compensated signal;
removing a resistive component of the secondary medium response signal from the compensated signal by a notch module;
using a signal vector resistive component demodulator to produce a vector resistive component output signal from output of the notch module;
using a vector reactive component demodulator to produce a vector reactive component output signal from the output of the notch module;
digitizing output from the signal vector resistive component demodulator and the signal vector reactive component demodulator to produce digital signals;
using a digital signal processor to process the digital signals;
removing a resistive component of the secondary target response signal from the output of the notch module when the target is located within the medium by a second notch module;
producing a vector resistive component output signal from output of the second notch module; and
producing a second vector reactive component output signal from the output of the second notch module.

13. The method as in claim 12, additionally comprising:
removing an additional resistive component of the secondary target response signal from the output of the notch module when the target is located within the medium by a third notch module;
producing a vector resistive component output signal from output of the third notch module; and
producing a second vector reactive component output signal from the output of the third notch module.

14. The method as in claim 12, wherein removing the resistive component of the secondary target response signal from the output of the notch module by the second notch module is performed using a target resistive component transfer function compensation circuit and a gate, wherein the gate and the target resistive component transfer function compensation circuit are configured to remove the resistive component of the secondary target response signal from the output of the notch module.

15. The method as in claim 12, additionally comprising:
using a timing generator to provide timing signals to a power amplifier for transmitting the signal, the notch module, the signal vector resistive component demodulator, the vector reactive component demodulator and the second notch module.

16. The method as in claim 12, additionally comprising:
performing low pass filtering on the output from the second notch module prior to the output from the second notch module being received by the second signal vector resistive component demodulator and the second vector reactive component demodulator.

17. The method as in claim 10:
wherein transmitting the signal is performed using a transmit coil; and
wherein receiving the response signal is performed using a receive coil.

18. The method as in claim 10, additionally comprising:
using a timing generator to provide timing signals to a power amplifier for transmitting the signal, the notch module, the signal vector resistive component demodulator and the vector reactive component demodulator.

* * * * *